Figure 1:
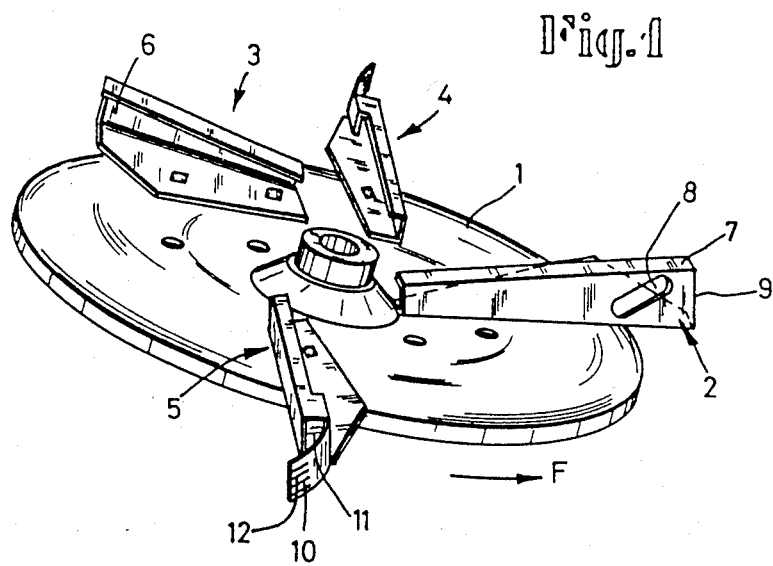

United States Patent [19]

Wiegelmann

[11] Patent Number: 4,725,005
[45] Date of Patent: Feb. 16, 1988

[54] DUAL-DISK FERTILIZER SPREADER

[75] Inventor: Hubert Wiegelmann, Salzkotten-Tudorf, Fed. Rep. of Germany

[73] Assignee: Accord-Landmaschinen Heinrich Weistre & Co. GmbH, Soest, Fed. Rep. of Germany

[21] Appl. No.: 2,688
[22] PCT Filed: Feb. 8, 1986
[86] PCT No.: PCT/DE86/00052
§ 371 Date: Aug. 13, 1986
§ 102(e) Date: Aug. 13, 1986
[87] PCT Pub. No.: WO86/04773
PCT Pub. Date: Aug. 28, 1986

[30] Foreign Application Priority Data

Feb. 16, 1985 [DE] Fed. Rep. of Germany ....... 3505382

[51] Int. Cl.⁴ ............................................. A01C 17/00
[52] U.S. Cl. .................................. 239/682; 198/642; 239/687; 416/185
[58] Field of Search .................. 239/672, 681–688, 239/665, 666, 667, 679; 416/185; 198/642; 222/410; 414/158, 174, 195, 211, 301

[56] References Cited

U.S. PATENT DOCUMENTS

| | | | |
|---|---|---|---|
| 1,655,780 | 1/1928 | Bruninger et al. | 239/682 |
| 2,085,171 | 6/1937 | Sheard | 239/682 |
| 3,966,124 | 6/1976 | Sukup . | |
| 4,300,725 | 11/1981 | Noherek . | |

FOREIGN PATENT DOCUMENTS

| | | | |
|---|---|---|---|
| 24724 | 7/1919 | Denmark | 239/687 |
| 0017128 | 10/1980 | European Pat. Off. . | |
| 0081257 | 6/1983 | European Pat. Off. . | |
| 581243 | 11/1963 | Fed. Rep. of Germany . | |
| 2407085 | 8/1975 | Fed. Rep. of Germany . | |
| 2065932 | 4/1977 | Fed. Rep. of Germany . | |
| 2652740 | 12/1977 | Fed. Rep. of Germany | 239/682 |
| 2908949 | 9/1980 | Fed. Rep. of Germany . | |
| 2913738 | 10/1980 | Fed. Rep. of Germany . | |
| 948289 | 1/1949 | France | 239/684 |
| 2382172 | 9/1978 | France . | |
| 1045370 | 10/1966 | United Kingdom | 239/682 |
| 673223 | 7/1979 | U.S.S.R. | 239/681 |
| 1159498 | 6/1985 | U.S.S.R. | 239/688 |

Primary Examiner—Andres Kashnikow
Attorney, Agent, or Firm—Merchant, Gould, Smith, Edell, Welter & Schmidt

[57] ABSTRACT

The invention concerns a dual-disk fertilizer spreader with two rotationally offset centrifugal disks that are equipped on their top side with followers, each displaying a vertical guide surface directed radially from the center of the centrifugal disk to the periphery of the centrifugal disk and a horizontal guide surface aligned in the direction of rotation of the centrifugal disk, with means being provided in the region of the vertical guide surface that separate and/or conduct the stream of fertilizer in other directions than that of the vertical guide surface.

5 Claims, 3 Drawing Figures

DUAL-DISK FERTILIZER SPREADER

The invention concerns a dual-disk fertilizer spreader in accordance with the precharacterizing clause of the principal claim Dual-disk fertilizer spreaders are known per se, for example from the French Offenlegungsschrift* No. 23 82 172. Dual-disk fertilizer spreaders belong to the so-called centrifugal spreaders that currently usually display two disks that are driven with a circumferential speed of 12 to 16 m per second and carry four followers. Almost without exception, we are dealing here with flat disks that throw off the fertilizer in the horizontal plane. Although in the case of modern fertilizer spreaders it is possible to achieve, in contrast to centrifugal fertilizer spreaders driven on the ground, a constant circumferential speed for the spreader disks via the power takeoff drive, continually recurring are irregularities in the scatter pattern over the entire scatter width, in particular when differnet types of fertilizers are used. This leads to overspreadings or bald spots that cause irregular plant start.

*Offenlegungsschrift = laid open print, published patent application (specification) examined only as to obvious defects but not as to patentability For the purpose of smoothing the scatter pattern and the throw width, known from the German Offenlegungsschrift No. 29 08 949 is how to construct the floor surface of the spreader disks, i.e. concavely, and how to use followers that are embodied in a certain manner.

A species-forming fertilizer spreader is described in the German Offenlegungsschrift No. 29 13 738.

In general, in the case of dual-disk centrifugal fertilizer spreaders, the problem consists of achieving an optimal overlapping of the scatter pattern, both toward the outside and in the middle (behind the tractor). The scatter pattern becomes more uniform if one travels with greater overlapping, i.e. with a higher circumferential speed. Then, however, posing a disadvantage is too strong overlapping in the center, behind the tractor. Then, it is no longer possible to spread half-sidedly with the spreader without additional parts, because one centrifugal disk spreads too far into the other half. By reducing the circumferential speed, the flanks of the scatter pattern become very steep outwardly and underfertilizing results in the center next to the tractor.

The task underlying the invention is to obtain a centrifugal fertilizer, i.e. a dual-disk fertilizer spreader with which it is possible to achieve a uniform scatter pattern over the entire scatter width and, actually, to do this also in the case of different types of fertilizers, i.e. therefore different grain weights and different grain sizes.

Compared to the known arrangement, the invention proposes that the deflecting means be constructed such that they separate (divide) the stream of fertilizer, completely or partially, into flight paths that lie in the plane of the disks, i.e. no rising of the flight paths is effected, but the flight paths of the deflected streams of granulate lie in the plane of the disks and are directed differently only within this plane.

This arrangement differs basically from the method of operation proposed in the German Offenlegungsschrift No. 29 13 738 and, in surprising fashion, achieves the effect that, for one thing, there results a smoothing of the outer areas of the scatter width in the direction of a flattening of the distribution curve and, for another thing, when spreading different types of fertilizers in the overlapping zones of the two spreader disks, i.e. in the area of the center of the path of travel, overlapping can be maintained small whereby one-sided spreading at the boundaries of the field is possible without expensive auxiliary arrangements.

Achieved in astonishing fashion by the arrangement in accordance with the invention is that the special embodiment of the followers enables a uniform scatter pattern over the entire scatter width, i.e. no overfertilizing and no bald spots, whereby with the device constructed in accordance with the invention, it is also possible to discharge different types of fertilizers and it is possible to achieve the same uniform scatter pattern over the entire scatter width.

One example of embodiment of the invention will be explained in the following with the aid of the drawing.

The drawing shows in

FIG. 1 in a perspective view, a centrifugal disk with four followers, in

Figure 2:
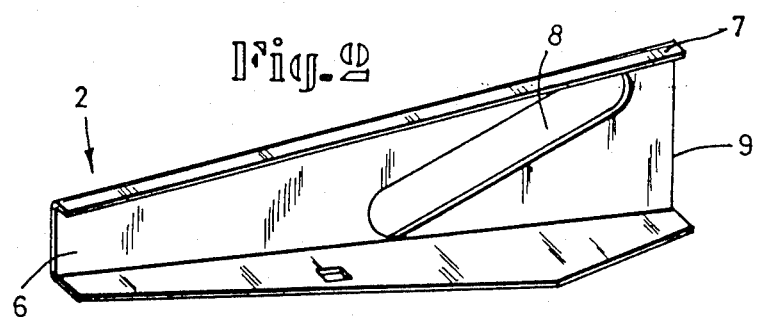

FIG. 2 a follower with a slotted passthrough opening and in

Figure 3:
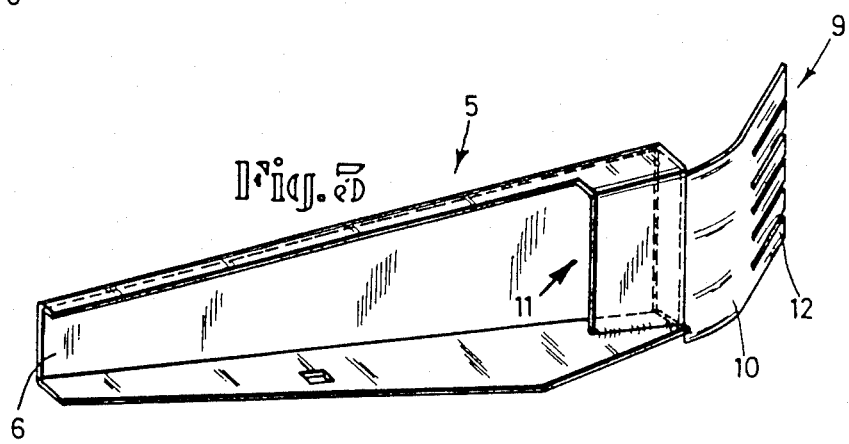

FIG. 3 a follower with a braking blade (scoop) at its discharge end.

Designated with 1 in FIG. 1, is a centrifugal disk that is driven by appropriate gear means, not represented in the drawing, in a circumferential movement corresponding to the arrow F.

Disposed on the top side of the centrifugal disk 1 are followers 2, 3, 4 and 5 that are constructed differently, with all followers having in common that they extend radially from the center of the disk to the circumferential surface of the centrifugal disk 1 and, in so doing, have a vertical guide surface 6 that carries at its top end edge a horizontal guide surface 7 which, pointing toward the inside of the vertical guide surface 6, grips over this latter, with the inner side being designated as the side against which the fertilizer fed from a supply tank, which is not represented, abuts with rotation of the centrifugal disk 1. The followers 2, 3 4, and 5 are attached in a manner known per se to the top side of the centrifugal disk.

Follower 2, which is represented in a larger scale in FIG. 2, displays in its vertical guide surface 6 a passthrough opening 8 that is constructed slotted, i.e. embodied as an oblong hole and that, as seen in the radial direction of the centrifugal disk, extends somewhat from the floor of the vertical guide surface upwardly toward the horizontal guide surface 7 and ends ahead of the discharge end 9, i.e. at the scattering edge of the vertical guide surface 6.

With movement of the fertilizer, i.e. guidance of the fertilizer from the center to the discharge end 9, a portion of the fertilizer can exit through this passthrough opening, whereby a smoothing of the outer regions of the scatter width in the direction of a flattening of the distribution curve follows. In the case of the followers 5 or 4 that are shown in FIG. 3 in a larger scale, provided at the discharge end 9 is a braking scoop 10 that is backwardly inclined opposite the direction of rotation F of the centrifugal disk 1. Located between the follower side end of the braking scoop 10 and the inner side of the vertical guide surface 6 is a fertilizer passthrough opening 11 so that the fertilizer guided by the vertical guide surface 6 reaches the inner side of the braking scoop 10. Here, the braking scoop 10 can, as can be recognized from FIG. 3, be equipped at its free end with slots 12. Achieved by means of the braking scoops is that, when spreading different types of fertilizers, overlapping within the overlapping zones of the two spreader disks, i.e. in the area of the center of the path of travel, can be maintained small, whereby one-sided spreading at the field boundaries is possible without expensive auxiliary arrangements (equipment).

Tests have shown that the best results, relative to solution of the task underlying the invention, can be achieved when the centrifugal disk 1 is equipped with a follower 3 that is constructed in customary fashion, i.e. as belonging to the state of the art. This follower 3 lies on the spreader disk 1 opposite to follower 2 that is equipped with a passthrough opening 8. Disposed between these two followers are the followers 4 and 5, each of which is equipped with a braking scoop 10. Resulting here was a completely uniform scatter pattern and, actually, as seen over the entire scatter width, in particular in the case of different types of fertilizers.

By operating (driving) only one centrifugal disk, and utilizing the follower in accordance with the invention, to be achieved simultaneously is a cleaner edge scattering so that spreading (scattering) over the boundary of the field, for example, is no longer to be feared.

What is claimed is:

1. A dual-disk granulate fertilizer spreader comprising:
   (a) two rotationally offset centrifugal disks (1); each disk having a top side;
   (b) a plurality of followers (2,3,4,5) mounted on each of said disk top sides;
      (i) each of said followers having a vertical guide surface (6); each vertical guide surface being directed radially from a center of an associated centrifugal disk to an outer periphery of the disk; each vertical guide having a top edge;
      (ii) each of said followers having a horizontal guide surface (7) thereon; each of said horizontal guide surfaces projecting outwardly from an associated vertical guide surface in a direction toward an operational direction of rotation of the associated disk; each of said horizontal guide surfaces being mounted to extend along a top edge of an associated vertical guide;
      (iii) each of said followers having an end region substantially adjacent each of said followers oriented near said outer periphery of an associated disk;
   (c) deflecting means in each of said followers, oriented in an end region of each follower, for deflecting a flight path of a stream of granulate operationally passing therealong; said deflecting means including means to at least partially separate a stream of granulate passing along said followers and guided by said vertical guide surfaces into flight paths lying in a plane of said associated disk;
   (d) at least one follower of each disk having a discharge end with a pass through opening therein; said pass through opening comprising a slot extending upwardly and outwardly toward said discharge end from substantially adjacent to, but spaced from, said associated centrifugal disk to a point substantially adjacent to and spaced from an outer edge of said follower.

2. A dual-disk granulate fertilizer spreader comprising:
   (a) two rotationally offset centrifugal disks (1); each disk having a top side;
   (b) at least four followers (2,3,4,5) mounted on each of said disk top sides;
      (i) each of said followers having a vertical guide surface (6) each vertical guide surface being directed radially from a center of an associated centrifugal disk to an outer periphery of the disk; each vertical guide having a top edge;
      (ii) each of said followers having a horizontal guide surface (7) thereon; each of said horizontal guide surfaces projectiog outwardly from an associated vertical guide surface in a direction toward an operational direction of rotation of the associated disk; each of said horizontal guide surfaces being mounted to extend along a top edge of an associated vertical guide;
      (iii) each of said followers having an end region substantially adjacent ends of said followers oriented near said outer periphery of an associated disk;
   (c) deflecting means in each of said followers, oriented in an end region of each follower, for deflecting a flight path of a stream of granulate operationally passing therealong; said deflecting means including means to at least partially separate a stream of granulate passing along said follower and guided by said vertical guide surfaces into flight paths lying in a plane of said associated disk;
   (d) a braking scoop mounted on a discharge end of each one of at least two of said followers on each disk; said braking scoop including a flange curved across a plane of an associated vertical guide surface in a direction opposite to said operational direction of rotation of the associated disk; each braking scoop flange having an inside surface oriented to contact and deflect granular material passing along said associated vertical guide surface, and each braking scoop including a pass through opening oriented to channel granular material therethrough and toward said flange.

3. A dual-disk fertilizer spreader according to claim 2 wherein each of said braking scoop flanges includes slots therein projecting outwardly in plane substantially parallel to a plane of each associated disk.

4. A follower for use on a disk of a granulate fertilizer spreader; said follower comprising:
   (a) a vertical guide surface having a top edge, a bottom edge and an outer end;
   (b) a horizontal guide surface mounted along and projecting outwardly from said vertical guide surface top edge;
   (c) deflecting means for deflecting a flight path of a stream of granulate passing along said follower; said deflecting means including means to at least partially separate said stream of granulate into flight paths lying in a plane substantially parallel to said horizontal guide surface and substantially coplanar with an associated disk;
   (d) said follower vertical guide surface having a discharge end with a passthrough opening therein; said passthrough opening comprising a slot extending upwardly toward said top edge from a position substantially adjacent to, but spaced from, said vertical guide surface bottom edge; said slot extending outwardly toward said discharge end as said top edge is approached.

5. A follower for use on a disk or a granulate fertilizer spreader; said follower comprising:
   (a) a vertical guide surface having a top edge, a bottom edge and an outer discharge end;

(b) a horizontal guide surface mounted along and projecting outwardly from said vertical guide surface top edge;

(c) deflectin means for deflecting a flight path of a stream of granulate passing along said follower; said deflecting means including means to at least partially separate said stream of granulate into flight paths lying in a plane substantially parallel to said horizontal guide surface and substantially coplanar with an associated disk;

(d) a braking scoop mounted on said discharge end; said braking scoop including a flange curved across a plane of said vertical guide surface and across a path of granulate discharged from said discharge end; said flange being curved to extend in a direction opposite a direction of projection of said horizontal guide surface; and (e) said follower being arranged to be mountable on a disk with said horizontal guide surface projecting in a direction toward a direction of operational rotation of said disk.

* * * * *